(12) United States Patent
Roy et al.

(10) Patent No.: US 8,178,147 B2
(45) Date of Patent: May 15, 2012

(54) COUMALIC ACID TO INHIBIT NON-ENZYMATIC BROWNING IN TEAS

(75) Inventors: Glenn Roy, Beacon, NY (US); Barry Gosselin, Danbury, CT (US)

(73) Assignee: Pepsico, Inc., Purchase, NY (US)

( * ) Notice: Subject to any disclaimer, the term of this patent is extended or adjusted under 35 U.S.C. 154(b) by 966 days.

(21) Appl. No.: 12/147,245

(22) Filed: Jun. 26, 2008

(65) Prior Publication Data

US 2009/0324788 A1  Dec. 31, 2009

(51) Int. Cl.
*A23F 3/00* (2006.01)
*A23F 3/16* (2006.01)
(52) U.S. Cl. .................................. 426/330.3; 426/597
(58) Field of Classification Search ............... 426/597, 426/330.3, 546
See application file for complete search history.

(56) References Cited

U.S. PATENT DOCUMENTS

| | | |
|---|---|---|
| 3,531,296 A | 9/1970 | Smithies |
| 4,018,907 A | 4/1977 | Scarpellino |
| 4,061,797 A | 12/1977 | Hannan, Jr. et al. |
| 4,925,686 A | 5/1990 | Kastin |
| 5,427,806 A | 6/1995 | Ekanayake et al. |
| 5,478,592 A | 12/1995 | Kingsley et al. |
| 5,780,086 A | 7/1998 | Kirksey et al. |
| 5,827,560 A | 10/1998 | Fu et al. |
| 5,879,733 A | 3/1999 | Ekanayake et al. |
| 5,895,672 A | 4/1999 | Cooper |
| 5,948,451 A | 9/1999 | Igarashi |
| 6,159,507 A * | 12/2000 | Igarashi ........................ 426/2 |
| 6,340,654 B1 | 1/2002 | Iijima |
| 6,368,651 B1 | 4/2002 | Gerlat et al. |
| 6,723,369 B2 | 4/2004 | Burgess |
| 2003/0008046 A1 | 1/2003 | Gerlat et al. |
| 2006/0073187 A1 | 4/2006 | Akimoto et al. |
| 2006/0217441 A1 | 9/2006 | Akimoto et al. |
| 2006/0228447 A1 | 10/2006 | Ganesan et al. |
| 2008/0020020 A1 | 1/2008 | Williamson |
| 2008/0038408 A1 | 2/2008 | Hosoya et al. |

OTHER PUBLICATIONS

Kim et al. "Various Antibrowning Agents and Green Tea Extract During Processing and Storage". Journal of Food Processing Preservation, vol. 27, 2003, pp. 213-225.*
T.A. Geissman, et al., "Organic Chemistry of Secondary Plant Metabolism," 1969, p. 210-211.

* cited by examiner

*Primary Examiner* — D Lawrence Tarazano
*Assistant Examiner* — Stephanie Cox
(74) *Attorney, Agent, or Firm* — Banner & Witcoff, Ltd.

(57) ABSTRACT

A tea beverage product that includes at least one tea component as well as coumalic acid or its salt to inhibit non-enzymatic browning of the tea beverage product. The tea component may be a green tea component, red tea component, black tea component, white tea component or a blend of tea components. The coumalic acid may be present in an amount less than 100 ppm. Alternatively, a coumalate may be employed, which will undergo hydrolysis within the tea beverage or concentrate product to form coumalic acid. In addition, a method for inhibiting non-enzymatic browning, by adding at least one of coumalic acid, a coumalic acid salt or a coumalate to a tea beverage composition.

23 Claims, 2 Drawing Sheets

COUMALIC ACID TO INHIBIT NON-ENZYMATIC BROWNING IN TEAS

FIELD OF THE INVENTION

This invention relates to tea beverages and other beverage products, such as tea beverage, concentrates, syrups and the like. In particular, this invention relates to tea beverages and other tea beverage products having formulations for preventing non-enzymatic browning.

BACKGROUND

It has long been known to produce beverages of various formulations. Improved and new formulations are desirable to achieve desired nutritional characteristics, flavor, shelf life, and other objectives. For example, it would be desirable to prevent the development of brown color in tea beverages that often occurs over time. There are two types of browning: enzymatic browning and non-enzymatic browning. Enzymatic browning occurs when fresh food or beverage products are exposed to air and there are active enzymes present within the food or beverage product. When an apple slice or banana turns brown, it is usually due to polyphenol oxidase enzyme activity. In contrast, non-enzymatic browning is the result of in situ oxidation of ingredients within juice or tea beverages. Non-enzymatic browning can produce brown, fluorescent, highly cross-linked pigments, such as melanoidin chromophores.

A possible mechanism for tea browning appears in the older literature [T. A. Geissman and D. H. G. Stout, Organic Chemistry of Secondary Plant Metabolism, Freeman, Cooper & Company, 1969, pg. 210-211]. A flavan-3,4 diol can participate in reversible, mild acid catalyzed reactions with catechins. Eventually, this reaction cascades to dimers that further condense to afford polymeric chromophores (browning pigments). The benzylic cation intermediates must be intercepted to prevent browning. Further, in some cases the pigments created have very high molecular weights, which can lead to the formation of floc within the beverages.

A common approach to inhibiting non-enzymatic browning in tea beverages is to include an antioxidant, generally ascorbic acid, in a beverage composition. However, if benzoic acid or salts thereof are also present in the beverage composition, ascorbic acid may promote decarboxylation of the benzoic acid to produce benzene. It would therefore be desirable to reduce or eliminate ascorbic acid from beverage compositions and employ an alternate edible acid to inhibit non-enzymatic browning in beverages, such as coumalic acid, while minimizing the formation of benzene.

It is an object of the invention to provide beverages and other beverage products having desirable appearance, taste and health properties. It is an object of at least certain embodiments of the invention to provide beverages and other beverage products having improved formulations. These and other objects, features and advantages of the invention or of certain embodiments of the invention will be apparent to those skilled in the art from the following disclosure and description of exemplary embodiments.

SUMMARY

In accordance with one aspect, a tea beverage product is provided, which includes at least one tea component, coumalic acid or a salt thereof, and little or no ascorbic acid. The tea beverage component may be a green, black, red (rooibos), white tea or mixture of tea components. Further, coumalic acid or its salt may be present in an amount between about 40 and 90 ppm, for inhibition of non-enzymatic browning of the tea beverage product.

In another aspect, a tea beverage product is provided, which contains at least one tea component, methyl coumalate, an edible acid and little or no ascorbic acid. In such a low pH tea beverage product, the methyl coumalate will undergo hydrolysis over time to form coumalic acid in situ. A concentrate of acidulant and methyl coumalate can also be pre-prepared and afford the hydrolytic product coumalic acid for use in tea manufacture by a bottler. In exemplary embodiments, non-enzymatic browning is inhibited such that the tea beverage product has a light measure value of at least 81, as measured by a Hunter calorimeter, following storage of the tea beverage product for a week after production at a temperature of up to 110 degrees Fahrenheit or for up to 16 weeks after production at a temperature of up to 70 degrees F.

In certain embodiments of the beverage and other products disclosed here, the tea component is selected from the *Camellia* genus. In certain such embodiments, the tea comprises material from the species *Camellia sinensis*. In certain exemplary embodiments of beverages according to this disclosure, the tea component is a green tea component. In other exemplary embodiments of beverages the tea component is a white tea component. In certain exemplary embodiments of the beverages, the tea component is a tea extract or tea powder that is included in a concentration of 0.02 to 0.30 percent tea solids weight to volume.

In accordance with a further aspect, a method is provided for inhibiting non-enzymatic browning by adding at least one of coumalic acid, a coumalic acid salt or methyl coumalate to a tea beverage composition that contains little or no ascorbic acid. In certain embodiments, the tea beverage is a green tea beverage, red (rooibos) tea beverage, black tea beverage, white tea beverage or a beverage comprising a mixture of teas.

In certain exemplary embodiments, the tea beverage product may be a concentrate, such as a syrup. In yet other embodiments, the concentrate may be a dry powder mix. In select embodiments, a plurality of tea components is utilized. In certain embodiments, the plurality of tea components originates from multiple plant species.

It will be appreciated by those skilled in the art, given the benefit of the following description of certain exemplary embodiments of the beverage and other beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF EMBODIMENTS

Figure 1:
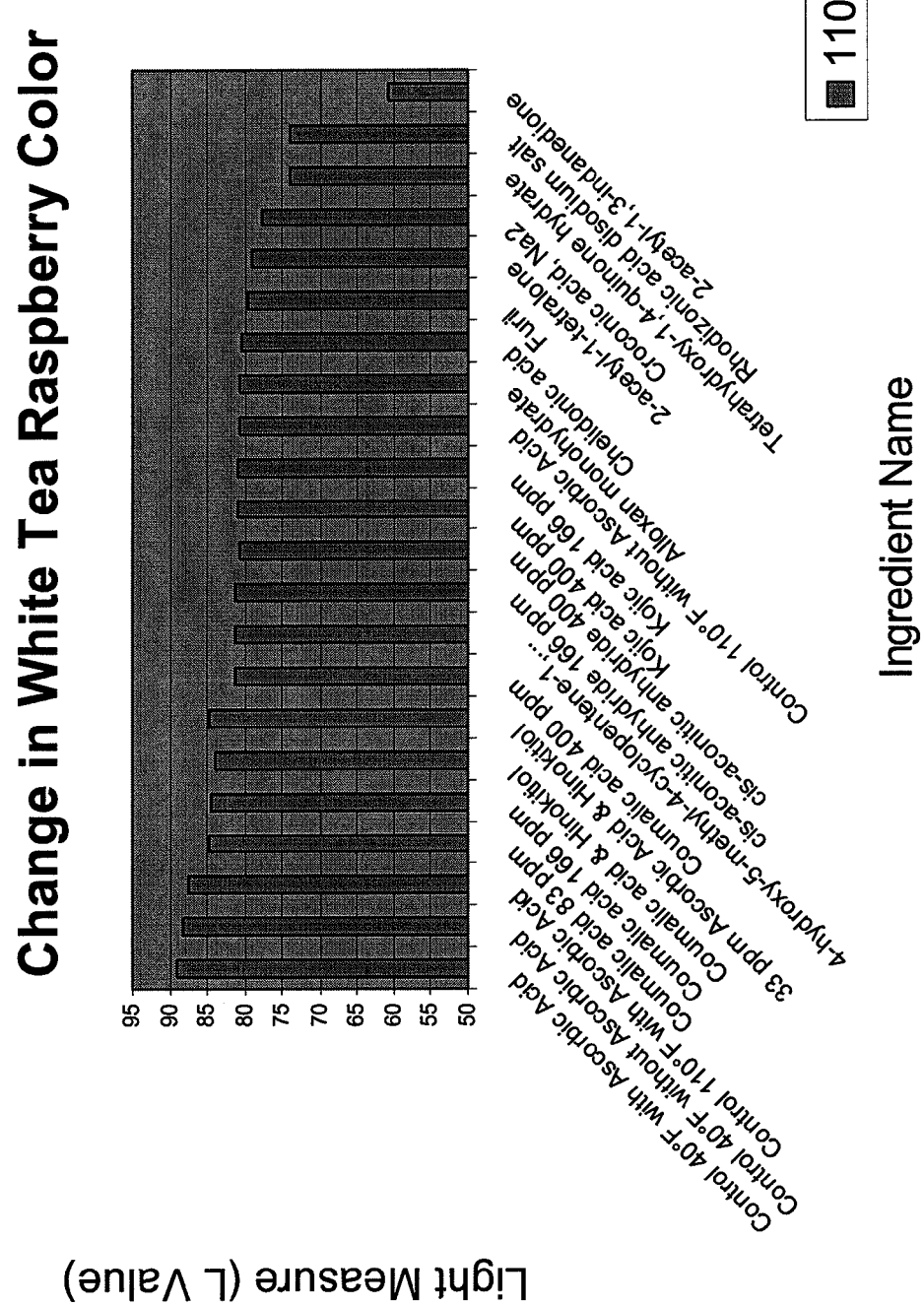
FIG. 1 provides a graph of luminance values for tea beverage samples.

It should be understood that beverages and other beverage products in accordance with this disclosure may have any of numerous different specific formulations or constitutions. The formulation of a beverage product in accordance with this disclosure can vary to a certain extent, depending upon such factors as the product's intended market segment, its desired nutritional characteristics, flavor profile and the like. For example, it will generally be an option to add further ingredients to the formulation of a particular beverage embodiment, including any of the beverage formulations described below. Additional (i.e., more and/or other) sweeteners may be added, flavorings, electrolytes, vitamins, fruit juices or other fruit products, tastants, masking agents and the like, flavor enhancers, and/or carbonation typically can be added to any such formulations to vary the taste, mouthfeel, nutritional characteristics, etc.

Coumalic acid is a dehydration dimer of malic acid, as shown in the following reaction:

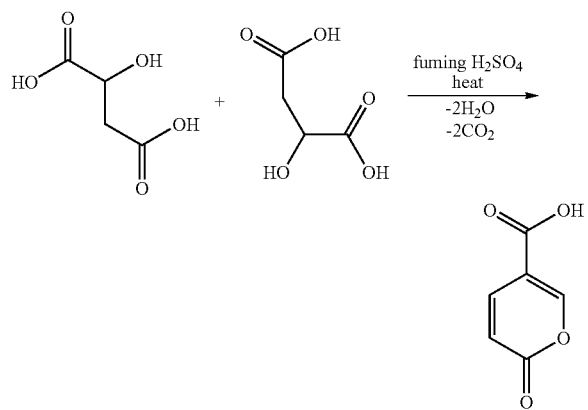

Substantially lower concentrations of coumalic acid in beverages are effective to inhibit non-enzymatic browning, as compared to the amount of ascorbic acid typically added to beverages to prevent browning. For example, less than 100 ppm coumalic acid provides a similar level of browning inhibition as 500 ppm ascorbic acid. Consequently, coumalic acid, methyl coumalate and salts of coumalic acid are good candidates for use to inhibit non-enzymatic browning in beverage compositions.

In general, a beverage in accordance with this disclosure typically comprises at least water, one or more tea components, acidulant and flavoring, and typically also sweetener. Exemplary flavorings which may be suitable for at least certain formulations in accordance with this disclosure include tea flavoring, citrus flavoring, spice flavorings and others. Carbonation in the form of carbon dioxide may be added for effervescence. Preservatives can be added if desired, depending upon the other ingredients, production technique, desired shelf life, etc. Additional and alternative suitable ingredients will be recognized by those skilled in the art given the benefit of this disclosure.

The beverage products disclosed here include beverages, i.e., ready to drink liquid formulations, beverage concentrates and the like. Beverages include, e.g., tea beverages, carbonated tea beverages, as well as liquid, slurry or solid concentrates, fruit juice-flavored and juice-containing tea beverages.

At least certain exemplary embodiments of the beverage concentrates contemplated are prepared with an initial volume of water to which the additional ingredients are added. Full strength beverage compositions can be formed from the beverage concentrate by adding further volumes of water to the concentrate. Typically, for example, full strength beverages can be prepared from the concentrates by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient in the beverages disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water,", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

Sweeteners suitable for use in various embodiments of the beverages disclosed here include nutritive and non-nutritive, natural and artificial or synthetic sweeteners. Suitable non-nutritive sweeteners and combinations of sweeteners are selected for the desired nutritional characteristics, taste profile for the beverage, mouthfeel and other organoleptic factors. Non-nutritive sweeteners suitable for at least certain exemplary embodiments include, but are not limited to, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. In certain embodiments the sweetener comprises acesulfame potassium. Other non-nutritive sweeteners suitable for at least certain exemplary embodiments include, for example, sorbitol, mannitol, xylitol, glycyrrhizin, D-tagatose, erythritol, meso-erythritol, maltitol, maltose, lactose, fructo-oligosaccharides, Lo Han Guo powder, xylose, arabinose, isomalt, lactitol, maltitol, trehalose, and ribose, and protein sweeteners such as thaumatin, monellin, brazzein, L-alanine and glycine, related compounds, and mixtures of any of them. Lo Han Guo, and related compounds are natural non-nutritive potent sweeteners.

In at least certain exemplary embodiments of the beverages disclosed here, the sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, Lo Han Guo juice concentrate and/or others.

Such sweeteners are present in at least certain exemplary embodiments in an amount of from about 0.1% to about 20% by weight of the beverage, such as from about 6% to about 16% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

According to certain embodiments of the beverage products disclosed here, the tea components comprise one or more tea extracts. As used herein, the term "tea extract" includes any and all extracted products from one or more biological tea materials. In certain exemplary embodiments, the biological materials comprise tea leaves. The leaves may be fresh, dried, pulverized, ground, heat-treated, partially or wholly fermented or combinations thereof. In yet other embodiments, stems, twigs, buds, flowers and/or other portions of biological materials from one or more tea varieties may be utilized in combination with leaves or individually separate from the leaves.

In certain exemplary embodiments, the tea extract may be obtained from a single variety of tea, such as biological materials from a single species. Yet in other embodiments the tea extract comprises a plurality of tea varieties, such as biological materials from several species of tea plants within a genus. In certain embodiments, the biological tea materials are selected from the *Camellia* genus. In certain such embodiments, the tea materials include the species *Camellia sinensis*. The one or more tea components may be black tea, oolong tea, green tea, white tea, red (rooibos) tea, herbal tea, citrus tea, infusions, and any and all extracts from biological materials as discussed below. In certain embodiments, the one or more tea components are green tea components or white tea components.

Methods for obtaining an extract from biological tea materials are well-known to those skilled in the art. Illustrative examples of producing tea extracts may be found, for example, in U.S. Pat. No. 3,531,296, filed Mar. 7, 1967, U.S. Pat. No. 5,827,560, filed Apr. 14, 1997, U.S. Pat. No. 5,895,672, filed Jan. 13, 1998, U.S. Pat. No. 5,780,086, filed Jul. 14, 1998 which are hereby incorporated by reference in their entireties.

In common extraction methods, biological tea materials are combined with water and/or one or more water soluble organic solvents. The water is often provided at elevated temperatures to expedite the process. Yet, other methods may incorporate pressure or otherwise alter the extraction environment to expedite or increase efficiency of the process. In certain embodiments, catechins available from the other raw materials and chemically synthesized products may also be utilized to increase the health benefits of the tea extract. It will be readily appreciated by those skilled in the art upon reading this disclosure that the amount of tea extract utilized will vary depending on a large quantity of factors, such as the flavor profile of the beverage product(s), the distribution and storage of the beverage product, economic considerations, the concentration of the non-nutritive sweetener in the beverage product, the amount of other ingredients of the beverage product.

The extract may be manufactured, distributed, and/or stored in different physical states and/or forms, including, for example, a solid, an aqueous solution or a slurry. In certain embodiments, aqueous solutions may introduced and/or removed to alter the state or form of the extract. The various aqueous solutions may include, for example, water, carbonated water or a tea extract having a different concentration of tea extract.

Acid used in beverages disclosed here can serve any one or more of several functions, including, for example, providing antioxidant activity, lending tartness to the taste of the beverage, enhancing palatability, increasing thirst quenching effect, modifying sweetness and acting as a mild preservative by providing microbiological stability. Ascorbic acid is often employed as an acidulant in tea beverages due to its ability as an antioxidant to inhibit non-enzymatic browning, generally in combination with another acidulant, such as citric acid. However, in exemplary embodiments of the invention, a form of coumalic acid is utilized in place of most or all of the ascorbic acid typically used to inhibit non-enzymatic browning in tea beverages. For example, coumalic acid or a salt of coumalic acid, such as potassium coumalate, may be used in combination with another edible acid in a tea beverage composition to provide browning inhibition, as well as to serve any of the other purposes of acids in beverages discussed above. In certain embodiments, between about 40 ppm and 150 ppm coumalic acid or salts thereof may be incorporated into a tea beverage composition to inhibit non-enzymatic browning. In other embodiments, coumalic acid or salts thereof may be employed in a tea beverage composition in combination with a small amount of ascorbic acid, such as up to about 50 ppm of ascorbic acid. This is in contrast to the 300-500 ppm of ascorbic acid typically employed to inhibit non-enzymatic browning.

In certain exemplary embodiments, a coumalate, for example an alkyl coumalate may be added to a tea beverage composition with an acid, and over time the coumalate will undergo hydrolysis to form coumalic acid within the tea beverage or preferably in the acidulant concentrate. Any suitable edible acid may be used to hydrolyze the coumalate, for example citric acid, malic acid, tartaric acid, phosphoric acid, ascorbic acid, lactic acid, formic acid, fumaric acid, gluconic acid, succinic acid, maleic acid and/or adipic acid. An acidulant concentrate comprising a coumalate, such as methyl coumalate, may be prepared by adding methyl coumalate and at least one edible acid to water, such as treated water. Any suitable coumalate may be employed, and non-limiting examples of alkyl coumalates include methyl coumalate, ethyl coumalate and propyl coumalate. According to one embodiment, the acidulant concentrate is heated to increase the rate at which an alkyl coumalate undergoes hydrolysis to coumalic acid. For example, the acidulant concentrate may be subjected to a temperature between about 70 and 100 degrees F. for a time between about 30 minutes and 5 weeks to substantially completely hydrolyze methyl coumalate to coumalic acid. An aliquot of the acidulant concentrate may be included in a tea beverage product, and the acidulant concentrate containing coumalic acid may perform multiple functions in the beverage. For instance, the acidulant may inhibit non-enzymatic browning and lower the pH of the beverage, in addition to other functions typically performed by an acidulant as discussed above.

The acid can be used in solution form, for example, and in an amount sufficient to provide the desired pH of the beverage. Typically, for example, the one or more acids of the acidulant are used in amount, collectively, of from about 0.01% to about 1.0% by weight of the beverage, e.g., from about 0.05% to about 0.5% by weight of the beverage, such as 0.1% to 0.25% by weight of the beverage, depending upon the acidulant used, desired pH, other ingredients used, etc.

The pH of at least certain exemplary embodiments of the beverages disclosed here can be a value within the range of 2.5 to 4.0. The acid in certain exemplary embodiments enhances beverage flavor. Too much acid can impair the beverage flavor and result in sourness or other off-taste, while too little acid can make the beverage taste flat. It will be within the ability of those skilled in the art, given the benefit of this disclosure, to select a suitable acid or combination of acids and the amounts of such acids for the acidulant component of any particular embodiment of the beverage products disclosed here.

Preservatives may be used in at least certain embodiments of the beverages disclosed here. That is, at least certain exemplary embodiments contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system can be used if desired. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoic acid, benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), dimethyl dicarbonate, and mixtures thereof, and antioxidants such as ascorbic acid, EDTA, BHA, BHT, TBHQ, EMIQ, dehydroacetic acid, ethoxyquin, heptylparaben, and combinations thereof.

Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure. In certain embodiments of the invention, benzoic acid or its salts (benzoates) may be employed as preservatives in the tea beverage products. As discussed above, when such preservatives are included in the tea beverage compositions, the use of ascorbic acid is minimized or excluded. Coumalic acid, instead, may be used to inhibit non-enzymatic browning of the tea beverage product.

Other methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

The beverage products disclosed here optionally contain a flavor composition, for example, natural and synthetic fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but that are commonly accepted as a berry. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime and grapefruit, and such flavors as apple, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of various of the above-mentioned flavors. In certain exemplary embodiments of the beverage concentrates and beverages a cola flavor component is used or a tea flavor component. The particular amount of the flavor component useful for imparting flavor characteristics to the beverages of the present invention will depend upon the flavor (s) selected, the flavor impression desired, and the form of the flavor component. Those skilled in the art, given the benefit of this disclosure, will be readily able to determine the amount of any particular flavor component(s) used to achieve the desired flavor impression.

Juices suitable for use in at least certain exemplary embodiments of the beverage products disclosed here include, e.g., fruit, vegetable and berry juices. Juices can be employed in the present invention in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavorings, to generate a beverage having the desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, lychee, lemon, orange, lime, tangerine, mandarin orange, tangelo, and pomelo and grapefruit etc. Numerous additional and alternative juices suitable for use in at least certain exemplary embodiments will be apparent to those skilled in the art given the benefit of this disclosure. In the beverages of the present invention employing juice, juice may be used, for example, at a level of at least about 0.2% by weight of the beverage. In certain exemplary embodiments juice is employed at a level of from about 0.2% to about 40% by weight of the beverage. Typically, juice can be used, if at all, in an amount of from about 1% to about 20% by weight.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The one or more flavorings can be used in the form of an emulsion. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide is used to provide effervescence to certain exemplary embodiments of the beverages disclosed here. Any of the techniques and carbonating equipment known in the art for carbonating beverages can be employed. Carbon dioxide can enhance the beverage taste and appearance and can aid in safeguarding the beverage purity by inhibiting and destroying objectionable bacteria. In certain embodiments, for example, the beverage has a $CO_2$ level up to about 7.0 volumes carbon dioxide. Typical embodiments may have, for example, from about 0.5 to 5.0 volumes of carbon dioxide. As used here and independent claims, one volume of carbon dioxide is defined as the amount of carbon dioxide absorbed by any given quantity of water at 60° F. (16° C.) temperature and atmospheric pressure. A volume of gas occupies the same space as does the water by which it is absorbed. The carbon dioxide content can be selected by those skilled in the art based on the desired level of effervescence and the impact of the carbon dioxide on the taste or mouthfeel of the beverage. The carbonation can be natural or synthetic.

The beverage concentrates and beverages disclosed here may contain additional ingredients, including, generally, any of those typically found in beverage formulations. These additional ingredients, for example, can typically be added to a stabilized beverage concentrate. Examples of such additional ingredients include, but are not limited to, caffeine, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), $B_1$ (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

EXAMPLES

Example 1

The efficacy for inhibition of non-enzymatic browning in tea beverage products exhibited by various compounds was tested experimentally by adding between 48 and 400 parts per million (ppm, mg/L) of a compound to a white tea raspberry matrix that did not contain ascorbic acid. The compounds chosen were highly electron rich carbonyl compounds such as pyrones, lactones, or had structures similar to those of pyrones, tropolones and ascorbic acid. The specific compounds and the amount of each compound employed in a white tea with raspberry matrix are listed below in Table 1. The ingredients of the white tea with raspberry matrix are listed below in Table 2.

Green or white tea beverage products were prepared as formulated and cold filled into 20 oz. polyethylene terephthalate (PET) bottles. Experimentation for browning inhibition was conducted by opening the PET-bottled tea and adding specified amounts (i.e., spiking) of each browning inhibitor. The beverages were re-capped and shaken to dissolve the addition. The tea beverages were then placed in an incubator set at 110° F. for one week.

TABLE 1

Compounds tested for inhibition of non-enzymatic browning in white tea with raspberry.

| Added Compound | Use Level |
|---|---|
| Ascorbic acid (Control stored at 40° F.) | 500 ppm |
| None (Control stored at 40° F.) | N/A |
| Ascorbic acid (Control stored at 110° F.) | 500 ppm |
| Coumalic acid | 83 ppm |
| Coumalic acid | 166 ppm |
| Coumalic acid & Hinokitiol | 166 ppm Coumalic acid & 48 ppm Hinokitiol |
| Low Ascorbic acid & Hinokitiol | 33 ppm Ascorbic acid & 48 ppm Hinokitiol |
| Coumalic acid | 400 ppm |
| 4-hydroxy-5-methyl-4-cyclopentene-1,3-dione monohydrate | 166 ppm |
| cis-aconitic anhydride | 166 ppm |
| cis-aconitic anhydride | 400 ppm |
| Kojic acid | 400 ppm |
| Kojic acid | 166 ppm |
| None (Control stored at 110° F.) | N/A |
| Alloxan monohydrate | 166 ppm |
| Chelidonic acid | 166 ppm |
| Furil | 166 ppm |
| 2-acetyl-1-tetralone | 166 ppm |
| Croconic acid, Na2 | 166 ppm |

TABLE 1-continued

Compounds tested for inhibition of non-enzymatic browning in white tea with raspberry.

| Added Compound | Use Level |
| --- | --- |
| Tetrahydroxy-1,4-quinone hydrate | 166 ppm |
| Rhodizonic acid disodium salt | 166 ppm |
| 2-acetyl-1,3-indanedione | 166 ppm |

TABLE 2

White Tea with Raspberry and Green Tea with Citrus Product Formulations, with and without Ascorbic Acid.

| White Tea with Raspberry | Current WTR | No Ascorbic WTR |
| --- | --- | --- |
| 77 Brix HFCS55 | 88.202 grams | 88.202 grams |
| Preservatives | 0.503 grams | 0.503 grams |
| Metal Chelators | 0.780 grams | 0.780 grams |
| Tea Powders | 0.97 grams | 0.97 grams |
| Acidulants | 1.694 grams | 1.694 grams |
| Antifoam - 10% Active DMPS | 0.053 grams | 0.053 grams |
| Ascorbic Acid | 0.300 grams | 0.000 grams |
| Acesulfame Potassium | 0.050 grams | 0.050 grams |
| Flavor | 0.586 grams | 0.586 grams |
| Treated Water to Volume | 1.0 liters | 1.0 liters |
| Green Tea with Citrus | Current GTC | No Ascorbic GTC |
| 77 Brix HFCS55 | 115.046 gms | 115.046 gms |
| Preservatives | 0.374 gms | 0.374 gms |
| Metal Chelators | 0.780 gms | 0.780 gms |
| Honey Granules | 0.499 gms | 0.499 gms |
| Green Tea Powder | 0.899 gms | 0.899 gms |
| Antifoam - 10% Active DMPS | 0.053 gms | 0.053 gms |
| Acidulants | 1.683 gms | 1.683 gms |
| Ascorbic Acid | 0.506 gms | 0.000 gms |
| Caramel Color (potassium) | 0.017 gms | 0.017 gms |
| Color Blue-1 | 0.0001 gms | 0.0001 gms |
| Color Yellow-5 | 0.001 gms | 0.001 gms |
| Flavors | 1.062 gms | 1.062 gms |
| Treated Water to Volume | 1.0 liters | 1.0 liters |

In addition to the spiked white tea with raspberry samples stored for one week at 110° F., control samples were tested, to measure the change in color of the white tea with raspberry composition without any added compounds, or containing 500 ppm ascorbic acid, and stored at either 40° F. for one week or at 110° F. for one week.

Following storage, the luminance was measured on a Hunter Colorimeter to determine the L value of each sample. A clear solution would provide an L value of 100, while a black opaque solution would have an L value of zero. Accordingly, inhibition of non-enzymatic browning results in higher L values than would be measured for tea beverage products in which non-enzymatic browning was allowed to occur. The L values of the experimental samples are shown in FIG. 1.

The white tea with raspberry control sample containing 500 ppm ascorbic acid that was stored at 110° F. had an L value of about 87.5, while the sample containing 83 ppm coumalic acid had an L value of almost 85. Thus, 83 ppm coumalic acid provided nearly as much non-enzymatic browning inhibition as six times as much ascorbic acid, in white tea with raspberry samples. Preferably, white tea with raspberry beverages should maintain an L value of at least 84 following storage at 110° F. for one week. Only samples containing ascorbic acid, coumalic acid and combinations of hinokitiol with ascorbic acid or coumalic acid resulted in white tea with raspberry samples having L values above 84 after storage for one week at 110° F. In more general terms, the L value of any tea beverage should not decrease more than about 3 to 5 units during storage under standard conditions, when the tea beverage comprises a browning inhibitor such as coumalic acid. Standard conditions may include up to sixteen weeks of storage at a temperature of up to 70° F., following manufacture of the tea beverage.

Example 2

The ability of coumalic acid to inhibit non-enzymatic browning in green tea was tested by adding either 42 or 83 ppm of coumalic acid to a green tea with citrus matrix that did not contain ascorbic acid. The ingredients of the green tea with citrus matrix were water, high fructose corn syrup, citric acid, green tea, sodium hexametaphosphate, honey, natural flavors, phosphoric acid, sodium benzoate, potassium sorbate, calcium disodium EDTA, caramel color, yellow 5 and blue 1.

The spiked green tea citrus samples were stored for one week at a temperature of 110° F. Further, control samples were tested to measure the change in color of the green tea with citrus composition without any added compounds, or containing 500 ppm ascorbic acid and stored at 40° F. for one week, or containing 500 ppm ascorbic acid and stored at 110° F. for one week.

The green tea with citrus samples were handled and analyzed by the same methods as the samples in Example 1, and the results are provided below in Table 3. Preferably, green tea with citrus beverages should maintain an L value of 82 or higher following storage at 110° F. for one week. The green tea with citrus control sample containing 500 ppm ascorbic acid that was stored at 110° F. had an L value of about 83, while the same control stored at 40° F. had an L value of almost 84.5. As a comparison, the green tea with citrus control sample without ascorbic acid and stored at 40° F. had an L value of 84. The samples containing 83 ppm coumalic acid and 42 ppm coumalic acid each had an L value of almost 82. Similar to the experiments involving white tea with raspberry, both 42 ppm and 83 ppm coumalic acid provided nearly as much non-enzymatic browning inhibition as 500 ppm ascorbic acid in the green tea with citrus samples.

TABLE 3

Compounds tested for inhibition of non-enzymatic browning in green tea with citrus.

| Added Compound | Use Level | L Value |
| --- | --- | --- |
| Ascorbic acid (Control stored at 40° F.) | 500 ppm | 84.35 |
| None (Control stored at 40° F.) | N/A | 84.00 |
| None (Control stored at 110° F.) | N/A | 76.00 |
| Ascorbic acid (Control stored at 110° F.) | 500 ppm | 83.08 |
| Coumalic acid | 83 ppm | 81.87 |
| Coumalic acid | 42 ppm | 81.49 |

Example 3

Figure 2:
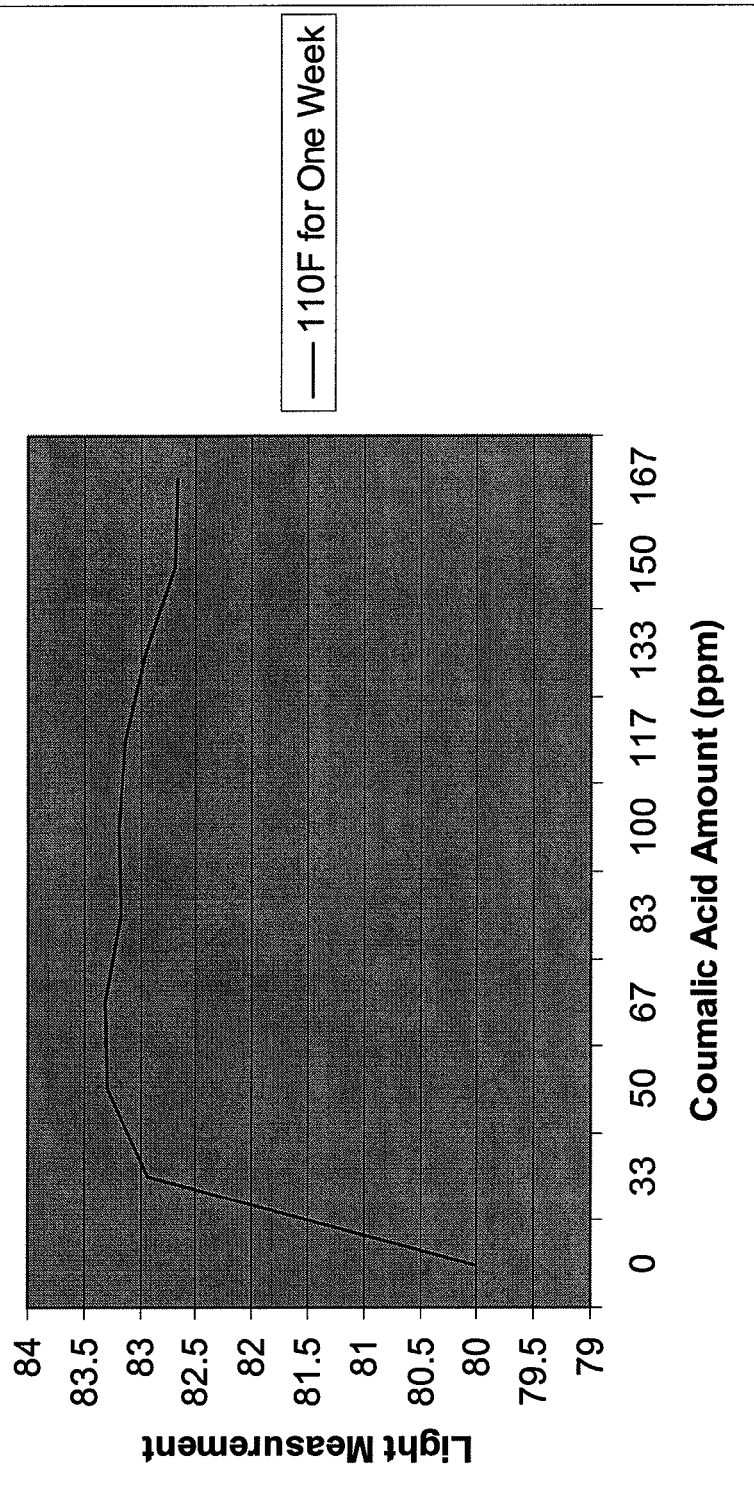
FIG. 2 provides a graph of luminance dose response for coumalic acid in white tea with raspberry samples.

The lowest effective amount of coumalic acid for inhibition of non-enzymatic browning was investigated in white tea with raspberry samples, prepared as described in Example 1. Coumalic acid was dosed into the white tea with raspberry samples at concentrations between 0 and 167 ppm. The dose response experimentation with coumalic acid showed a useful minimum inhibitory level of 33 ppm, as illustrated in FIG. 2.

Example 4

Coumalic acid may be prepared by dissolving 91 mg (5.92 mmol) of methyl coumalate into 1 mL of treated water with the specified amount of citric acid and/or 80% phosphoric acid acidulants listed in the beverage product formulations in Example 1. The solution is warmed at 90° F. for 30 minutes and then provided as the acidulant used to make the proper pH of tea for one liter and deliver approximately 83 mg/L of coumalic acid, assuming complete hydrolysis of the methyl coumalate to coumalic acid.

Given the benefit of the above disclosure and description of exemplary embodiments, it will be apparent to those skilled in the art that numerous alternate and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A tea beverage product comprising:
   water;
   at least one tea component; and
   a browning inhibitor comprising coumalic acid or a salt thereof.

2. The tea beverage product of claim 1, comprising at least two tea components.

3. The tea beverage product of claim 1, wherein the at least one tea component is selected from the group consisting of a white tea component, a green tea component, a red (rooibos) tea component, a black tea component, and combinations thereof.

4. The tea beverage product of claim 1, wherein the coumalic acid or a salt thereof is present at a concentration of between about 40 ppm and about 150 ppm.

5. The tea beverage product of claim 1, wherein, after one week of storage at a temperature of up to 110° F. following manufacture, the tea beverage has a luminance value of no more than 5 units less than the light measure value of the same tea beverage product stored for the same amount of time at 40° F., as measured by a Hunter Colorimeter.

6. The tea beverage product of claim 1, wherein, after up to sixteen weeks of storage at a temperature of up to 70° F. following manufacture, the tea beverage has a luminance value of no more than 5 units less than the light measure value of the same tea beverage product stored for the same amount of time at 40° F., as measured by a Hunter Colorimeter.

7. The tea beverage product of claim 1, wherein the coumalic acid salt is potassium coumalate.

8. A tea beverage product comprising:
   water;
   at least one tea component; and
   a browning inhibitor comprising coumalic acid, wherein the coumalic acid is provided by hydrolysis of a coumalate and at least one edible acid in the tea beverage product.

9. The tea beverage product of claim 8, wherein the at least one tea component is selected from the group consisting of a green tea component, a white tea component, a red (rooibos) tea component, a black tea component or mixtures thereof.

10. The tea beverage product of claim 8, wherein the coumalic acid is present at a concentration of between about 40 ppm and about 150 ppm.

11. The tea beverage product of claim 8, wherein the at least one tea component is a green tea component, a white tea component, or a combination thereof.

12. The tea beverage product of claim 8, wherein, after up to sixteen weeks of storage at a temperature of up to 70° F. following manufacture, the tea beverage has a luminance value of no more than 5 units less than the light measure value of the same tea beverage product stored for the same amount of time at 40° F., as measured by a Hunter Colorimeter.

13. The tea beverage product of claim 8, wherein, after one week of storage at a temperature of up to 110° F. following manufacture, the tea beverage has a luminance value of no more than 5 units less than the light measure value of the same tea beverage product stored for the same amount of time at 40° F., as measured by a Hunter Colorimeter.

14. A method for inhibiting non-enzymatic browning of a tea beverage product comprising:
    providing a tea beverage composition; and
    adding at least one compound selected from the group consisting of coumalic acid, a coumalic acid salt, and a coumalate to the tea beverage composition.

15. The method of claim 14, wherein the compound is methyl coumalate and the methyl coumalate undergoes hydrolysis in the tea beverage product to form coumalic acid.

16. The method of claim 14, wherein the tea beverage composition comprises at least one green tea component, at least one white tea component or a combination thereof.

17. The method of claim 14, wherein, after one week of storage at a temperature of up to 110° F. following manufacture, the tea beverage product has a luminance value of no more than 5 units less than the light measure value of the same tea beverage product stored for the same amount of time at 40° F., as measured by a Hunter Colorimeter.

18. A tea beverage product comprising:
    water;
    at least one tea component; and
    a browning inhibitor comprising a coumalate and at least one edible acid.

19. The tea beverage product of claim 18, wherein the at least one tea component is selected from the group consisting of a green tea component, a white tea component, a red (rooibos) tea component, a black tea component or mixtures thereof.

20. The tea beverage product of claim 18, wherein the coumalate is selected from the group consisting of methyl coumalate, ethyl coumalate, propyl coumalate, and combinations thereof.

21. The tea beverage product of claim 18, wherein the at least one tea component is a green tea component, a white tea component, or a combination thereof.

22. The tea beverage product of claim 18, wherein, after up to sixteen weeks of storage at a temperature of up to 70° F. following manufacture, the tea beverage has a luminance value of no more than 5 units less than the light measure value of the same tea beverage product stored for the same amount of time at 40° F., as measured by a Hunter Colorimeter.

23. The tea beverage product of claim 18, wherein, after one week of storage at a temperature of up to 110° F. following manufacture, the tea beverage has a luminance value of no more than 5 units less than the light measure value of the same tea beverage product stored for the same amount of time at 40° F., as measured by a Hunter Colorimeter.

* * * * *